US010587901B2

(12) United States Patent
Agostinelli

(10) Patent No.: US 10,587,901 B2
(45) Date of Patent: Mar. 10, 2020

(54) METHOD FOR THE ENCODING AND DECODING OF HDR IMAGES

(71) Applicant: TRELLIS EUROPE S.R.L., Galazzano (SM)

(72) Inventor: Massimiliano Agostinelli, Rome (IT)

(73) Assignee: TRELLIS EUROPE S.R.L., Galazzano (SM)

(*) Notice: Subject to any disclaimer, the term of this patent is extended or adjusted under 35 U.S.C. 154(b) by 0 days.

(21) Appl. No.: 15/779,370

(22) PCT Filed: Nov. 25, 2016

(86) PCT No.: PCT/IT2016/000279
§ 371 (c)(1),
(2) Date: May 25, 2018

(87) PCT Pub. No.: WO2017/090068
PCT Pub. Date: Jun. 1, 2017

(65) Prior Publication Data
US 2018/0278968 A1 Sep. 27, 2018

(30) Foreign Application Priority Data
Nov. 26, 2015 (IT) .............. UB2015A5949

(51) Int. Cl.
H04B 1/66 (2006.01)
H04N 19/98 (2014.01)
(Continued)

(52) U.S. Cl.
CPC ............ H04N 19/98 (2014.11); H04N 5/202 (2013.01); H04N 19/186 (2014.11); H04N 19/46 (2014.11); H04N 19/503 (2014.11)

(58) Field of Classification Search
CPC ................... H04N 19/98; H04N 19/70; G06T 2207/20208
See application file for complete search history.

(56) References Cited

U.S. PATENT DOCUMENTS 8,237,865 B2  8/2012  Salvucci
8,462,194 B2  6/2013  Salvucci
(Continued)

FOREIGN PATENT DOCUMENTS

EP   2445214       4/2012
WO   2013039730    3/2013
(Continued)

OTHER PUBLICATIONS

"Adaptive Logarithmic Mapping for Displaying High Contrast Scenes", Computer Graphics Forum, vol. 22, No. 3, Sep. 1, 2003 (Sep. 1, 2003), pp. 419-426, URL: http://resources.mpi-inf.mpg.de/tmo/logmap/logmap.pdf (Year: 2003).*
(Continued)

Primary Examiner — Sath V Perungavoor
Assistant Examiner — Peet Dhillon
(74) Attorney, Agent, or Firm — Colby Nipper PLLC

(57) ABSTRACT

This document describes methods and devices for encoding and decoding images and videos, including encoding high dynamic range images, both static images and video frames. In aspects, a high dynamic range image is acquired, a dynamic range value of the high dynamic range image and an image average luminance value of the high dynamic range image is calculated, the high dynamic range image is converted to a low dynamic range, and the low dynamic range is compressed. In aspects, a low dynamic range image is decoded back into a high dynamic range image.

20 Claims, 6 Drawing Sheets

(51) Int. Cl.
*H04N 19/46* (2014.01)
*H04N 5/202* (2006.01)
*H04N 19/503* (2014.01)
*H04N 19/186* (2014.01)

(56) References Cited

U.S. PATENT DOCUMENTS

| | | | |
|---|---|---|---|
| 9,058,639 B2 | 6/2015 | Salvucci | |
| 9,578,335 B2 | 2/2017 | Salvucci | |
| 9,736,483 B2 | 8/2017 | Salvucci | |
| 2010/0329554 A1* | 12/2010 | Zhai | G09G 3/2003 382/167 |
| 2015/0023433 A1* | 1/2015 | Ninan | 19/647 |
| 2017/0310981 A1 | 10/2017 | Agostinelli | |
| 2019/0208218 A1 | 7/2019 | Agostinelli | |

FOREIGN PATENT DOCUMENTS

| | | |
|---|---|---|
| WO | 2016055875 | 4/2016 |
| WO | 2017090068 | 6/2017 |

OTHER PUBLICATIONS

"International Search Report and Written Opinion", PCT Application No. PCT/IT2016/000279, dated Mar. 22, 2017, 11 pages.
"Preliminary Report on Patentability", PCT Application No. PCT/IT2016/000279, dated Feb. 12, 2018, 22 pages.
Drago, et al., "Adaptive Logarithmic Mapping for Displaying High Contrast Scenes", Computer Graphics Forum, Eurograhics 2003; P. Brunet and D. Fellner; vol. 22, No. 3, Sep. 1, 2003, 10 pages.
Salih, et al., "Tone Mapping of HDR Images: A Review", IEEE; Intelligent and Advanced Systems (ICIAS); 2012 4th International Conference on Intelligent and Advanced Systems, 2011, pp. 368-373.
"International Search Report", PCT Application No. PCT/IB2017/052956, dated Sep. 18, 2017, 4 pages.
Francois, et al., "High Dynamic Range and Wide Color Gamut Video Coding in HEVC: Status and Potential Future Enhancements", IEEE Transactions on Circuits and Systems for Video Technology, vol. 26, No. 1, Jan. 2016, 2016, 14 pages.
Garbas, et al., "Inter-Layer Prediction for Backwards Compatible High Dynamic Range Video Coding with SVC", 2012 Picture Coding Symposium, May 7-9, 2012, Krakow, Poland, May 2012, 4 pages.
Mai, et al., "Optimizing a Tone Curve for Backward-Compatible High Dynamic Range Image and Video Compression", IEEE Transactions on Image Processing, vol. 20, No. 6, Jun. 2011, Jun. 2011, 14 pages.
Spaulding, et al., "Extending the Color Gamut and Dynamic Range of an sRGB Image Using a Residual Image", Electronic Imaging Products, R&D, Eastman Kodak Company, Jul. 2, 2002, 16 pages.
Pursuant to MPEP § 2001.6(b) the applicant brings the following co-pending application to the Examiner's attention: U.S. Appl. No. 16/303,575.
Chen, et al., "JPEG Compatible Coding of High Dynamic Range Imagery using Tone Mapping Operators", School of Computer Science, The University of Nottingham, UK, and, Thomson Broadband R&D (Beijing) Co., Ltd, China, Jan. 2006, 7 pages.
Mantiuk, et al., "Backward Compatible High Dynamic Range MPEG Video Compression", MPI Informatik, 2006, 11 pages.

* cited by examiner

Fig. 7a ORIGINAL
Fig. 7b ENCODED
Fig. 7c DECODED

METHOD FOR THE ENCODING AND DECODING OF HDR IMAGES

TECHNICAL FIELD

The present invention relates to methods for encoding and decoding images and videos.

Particularly the invention relates to methods, computer programs and apparatuses able to encode and decode high dynamic range images.

PRIOR ART

From early digital photography up to current times technology has considerably moved forward.

Nowadays also widespread devices, such as smartphones, allow high dynamic range photographs to be taken, particularly HDR images (English acronym for High Dynamic Range) having a color range much higher than conventional 8-bit images (called also as LDR or low dynamic range images).

While LDR images represent each color channel (Red, Green or Blue) with 8 bits and therefore allowing 256 different shades for each color channel to be provided, in the case of HDR images the colors are represented in floating point, usually using 16 or 32 bits per color channel.

The floating point representation therefore allows a number of shades to be provided that is extraordinarily higher than 256 shades provided for 8-bit images, however the number of bits necessary for representing an image considerably increases and involves a series of problems related to memory space necessary for storage, and to the band necessary for transmission.

Therefore compression of HDR images is a very common problem.

Methods of compression without losses (lossless) such as those provided for the OpenEXR format do not allow very high compressions to be achieved and require an excessive computational burden.

Methods of compression with losses (lossy) such as JPEG and MPEG, are not effective when directly applied to HDR images since they cannot encode images with more than 10-12 bits.

In order to allow HDR images to be compressed by using conventional JPEG or MPEG codecs, literature provides several methods for decomposing the HDR image into two low dynamic range images: LDR image (obtained from the HDR image through clamping or tone mapping processes) and Residual image. The two images obtained in this manner are individually compressed and saved or transmitted. The HDR image is therefore reconstructed starting from the two low dynamic range images.

Examples of such solutions are known from U.S. Pat. No. 8,462,194 and different scientific articles, such as "JPEG Compatible Coding of High Dynamic Range Imagery using Tone Mapping Operators" (Min Chen et al., The 25th Picture Coding Symposium, 2006) and "Backward Compatible High Dynamic Range MPEG Video Compression", by R. Mantiuk et al. [ACM Transactions on Graphics (TOG)— Proceedings of ACM SIGGRAPH 2006, Volume 25 Issue 3, July 2006, Pages 713-723, ACM New York, N.Y., USA].

Such solutions allow the HDR image to be faithfully reconstructed and contemporaneously allow for a backward compatibility with low dynamic range image readers. Such solutions however have the drawback of requiring large space for storage and great band for transmission.

Several methods are also known in prior art for passing from a floating point representation with 16 or more bits to 8-bit representation (LDR). Photoshop® program for example provides different functions that allow exposure and other parameters of the image to be varied in the dynamic range compression process. The choice of the parameters is given to the user that by trying and trying again, finds the best parameters image by image. Moreover such functions do not originate with the aim of compressing a HDR image such to allow the HDR image to be later reconstructed from the saved LDR image, but with the aim only of saving a LDR image as much faithful as possible to the original one.

Therefore there is the need for a method that is repeatable without excessive efforts by the users and that allows a high dynamic range image to be efficiently and reversibly compressed.

OBJECTS AND SUMMARY OF THE INVENTION

The object of the present invention is to overcome prior art drawbacks.

Particularly the object of the present invention is to provide a method allowing high dynamic range images to be effectively compressed and decompressed, a more faithful reconstruction occurs if the input image does not exceed 14 F-stops of aperture.

These and further objects of the present invention are achieved by means of encoding and decoding methods embodying the characteristics of the annexed claims, which are an integral part of the present description.

In one aspect the invention relates to a method for encoding high dynamic range images, both static images and video frames. The method comprises the steps of:
  a) acquiring a high dynamic range image in floating point format;
  b) calculating the dynamic range of the acquired image;
  c) calculating the image average luminance;
  d) calculating a parameter dynamic_range by adding to or subtracting from the dynamic range value calculated at step b) a predetermined value, the addition or subtraction of such predetermined value depending on image average luminance calculated at step c);
  e) multiplying the values of the pixels of the acquired image by a factor equal to $2^{-dynamic\_range}$, that is 2 raised to −dynamic_range;
  f) raising to a power equal to $1.0/(2.2+add\_gamma)$ the values of the pixels calculated at step e), where add_gamma is a value higher than or equal to zero;
  g) reducing the number of bits used for encoding the image pixels such to convert the image in a format with a dynamic range lower than that of the acquired image;
  a) compressing the lower dynamic range image.

As proved by experimental results carried out, such solution allows the high dynamic range image to be effectively compressed, thus it being possible to save it with a low dynamic range on a file or to transmit it with lower space and/or band occupancy. The type of performed encoding makes it possible to faithfully reconstruct the high dynamic range image starting from the saved low dynamic range image without requiring additional data streams, as it occurred in some prior art solutions that, besides saving a low dynamic range image, provided also to generate and save a residual image necessary for reconstructing the high dynamic range image.

The invention relates also to a corresponding image decoding method and to devices for encoding and decoding images and videos.

Particularly in one embodiment for encoding videos containing a plurality of images (frames) the encoding method provides to calculate the parameter dynamic_range (as described above and in more details below) for each video frame, therefore it is provided to calculate the average value dynamic_range_avg of the parameters dynamic_range calculated for the frames. In this embodiment, for encoding the frames at step e) the values of the pixels of the acquired image are multiplied by a factor equal to $2^{-dynamic\_range\_avg}$. Such solution makes it possible to reduce metadata that have to be transmitted in an encoded and compressed video signal for bringing it back to high dynamic range.

Further advantageous characteristics are the subject matter of the annexed claims, that are an integral part of the present description.

BRIEF DESCRIPTION OF THE DRAWINGS

The invention will be described below with reference to some not limitative examples, provided by way of example and not as a limitation in the annexed drawings. These drawings show different aspects and embodiments of the present invention and, where appropriate, reference numerals showing like structures, components, materials and/or elements in different figures are denoted by like reference numerals.

FIGS. 7a, 7b and 7c are a high dynamic range image, an image obtained after a encoding process by the method of FIG. 1 and, the high dynamic range image reconstructed by applying the method of FIG. 6 starting from the image of FIG. 7b respectively.

DETAILED DESCRIPTION OF THE INVENTION

Figure 1:
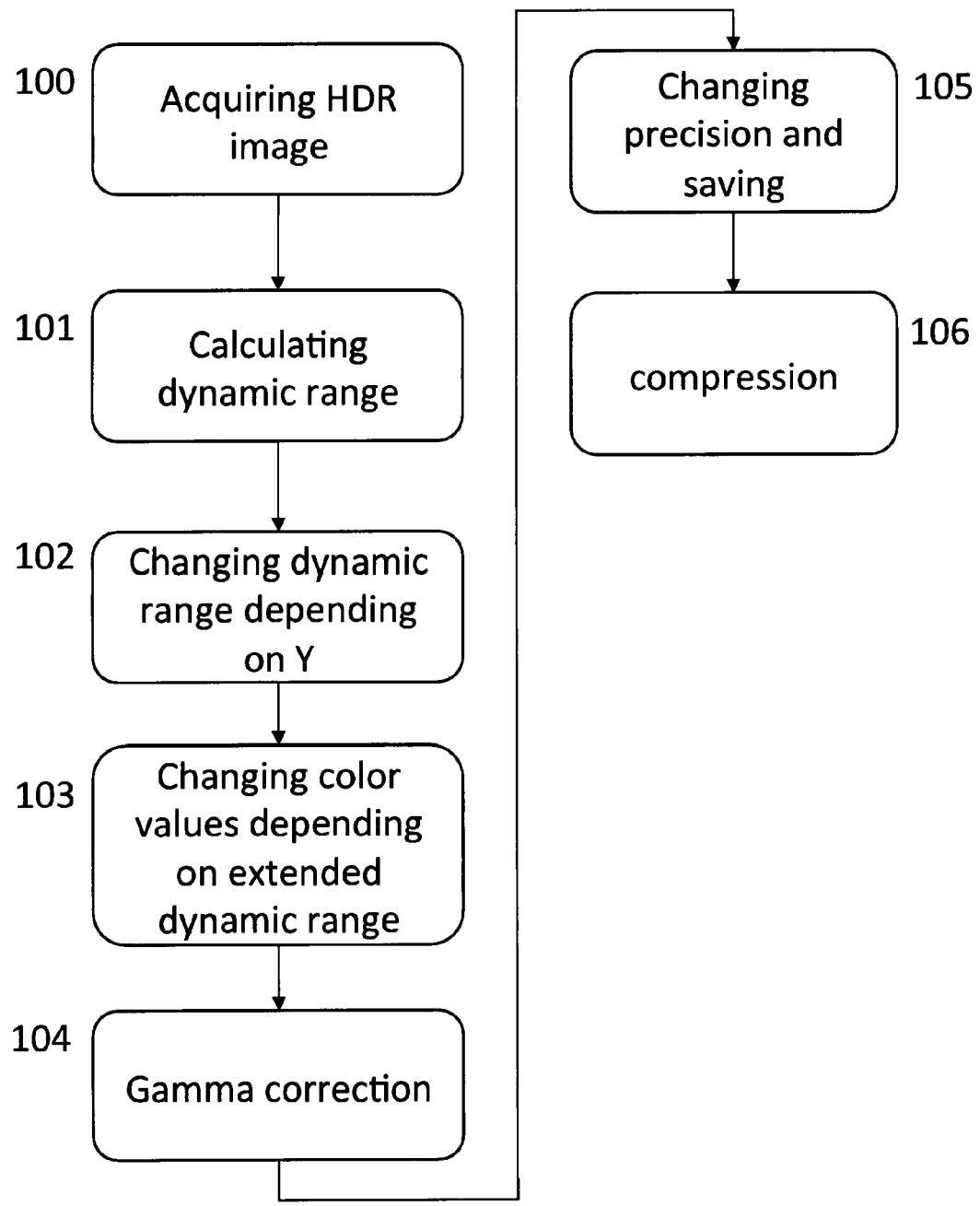
FIG. 1 is a flow chart of a method for encoding high dynamic range images.

While the invention is susceptible of various modifications and alternative constructions, some preferred embodiments are shown in the drawings and will be described in details herein below.

It should be understood, however, that there is no intention to limit the invention to the specific disclosed embodiment but, on the contrary, the invention intends to cover all the modifications, alternative constructions and equivalents that fall within the scope of the invention as defined in the claims.

The use of "for example", "etc.", "or" denotes non-exclusive alternatives without limitation, unless otherwise noted.

Figure 2:
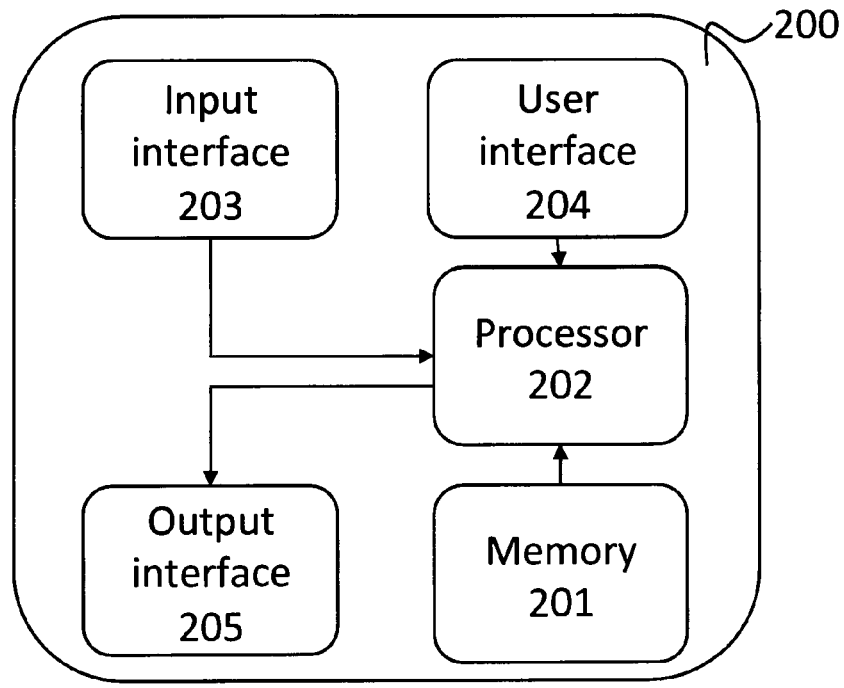
FIG. 2 schematically is an encoder able to implement the method of FIG. 1.

The use of "comprises" means "comprises, but not limited to", unless otherwise noted. FIG. 1 shows a flow chart of a method encoding high dynamic range images implemented by a encoding device (encoder) 200 outlined in FIG. 2 and provided with memory areas 201 wherein code portions are stored that, once executed by the processor 202, allow the encoding method described below to be implemented.

The method starts at step 100 where a high dynamic range image is acquired. The acquisition is performed by the input interface 203 of the encoder 200 and it can be directly performed through an external acquisition device (for example a camera) connected to the encoder, or by acquiring a file saved on a physical medium (hard disk or USB drive).

In the example below the values of the colors of the pixels are supposed to be expressed in the floating point format.

Then, step 101, the dynamic range of the HDR image is calculated.

The dynamic range is calculated as the ratio (expressed in logarithmic scale) of the maximum to the minimum value of luminance of the input image, as expressed in the formula (1) below:

$$\text{dyn\_range}=\log 10(\max\_Y/\min\_Y); \qquad (1)$$

where max_Y and min_Y are maximum and minimum luminance value.

The luminance value of the image pixels can be an immediately available datum, for example if the image is encoded in the YUV color space or it can be calculated from color values of the pixels. For example the luminance value of each pixel can be calculated according to the formula (2) below:

$$Y=p1*R+p2*G+p3*B \qquad (2)$$

where p1, p2 and p3 are the primaries of the input color space, e.g. REc709 or REc2020. Generally the calculation of the dynamic range can be performed by calculation algorithms already known per se depending on the color space of the input image. The color space of the input image has to be known to the encoder, to this end the method provides to give to the encoder information about the color space of the input image, such information can be provided to the encoder by a user of the encoder through a suitable user interface 204, or it can be automatically acquired by the encoder, for example from metadata of the acquired image.

Since the luminance minimum can be lower than zero, in one embodiment, the calculation of the dynamic range provides to check whether min_Y<0 and, if so, the dynamic range is calculated by setting min_Y to a small value as desired, but higher than zero, for example it is taken as min_Y=1e−6.

Figure 4:
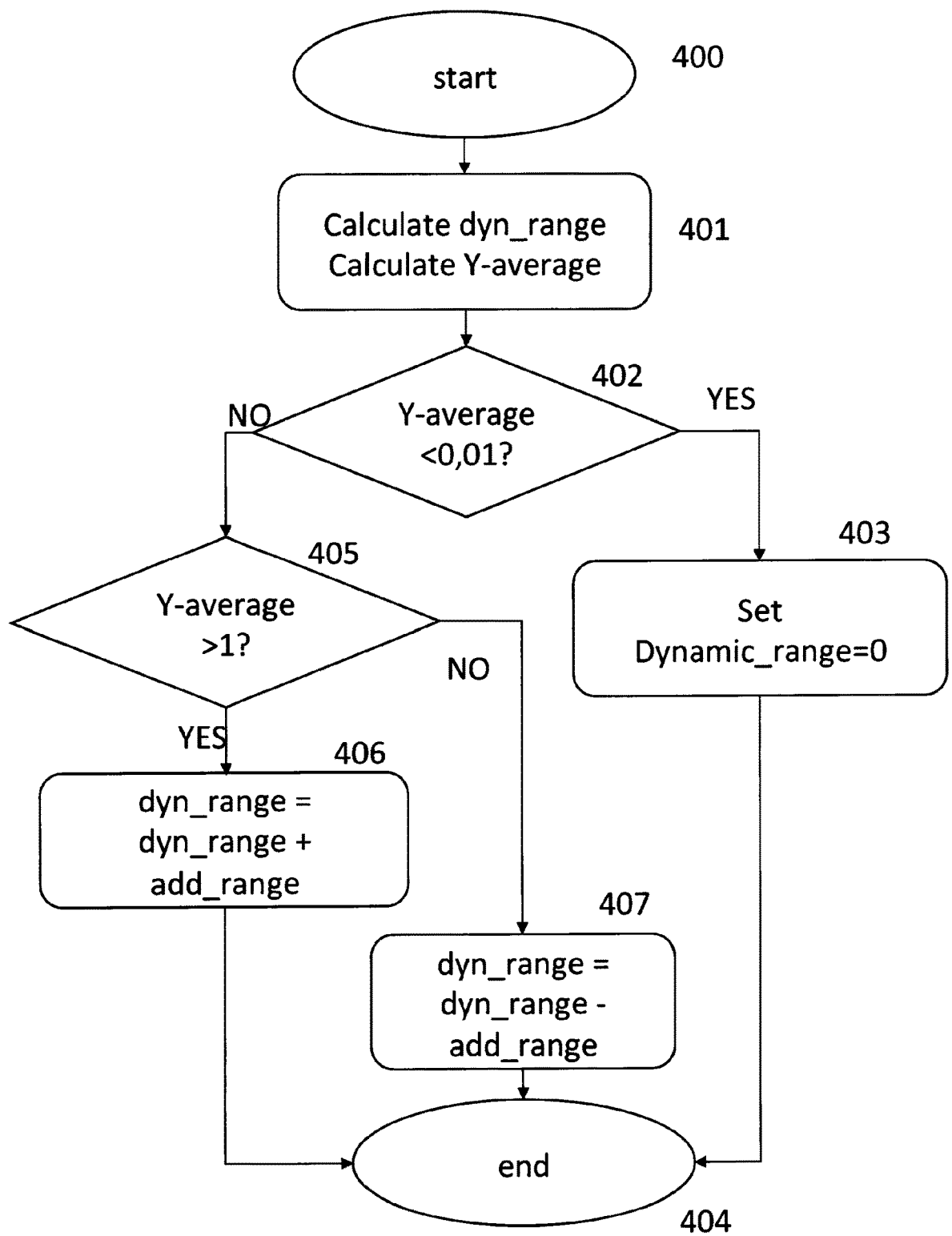
FIG. 4 schematically is a flow chart of a method for calculating a dynamic range to be used in the encoding process of FIG. 1.

After having calculated the dynamic range dyn_range, the encoder (step 102) changes the pixel value such to simulate a change of the image exposure. Such process changing the pixel values is performed depending on the image average luminance value, for example according to the process described below with reference to FIG. 4.

Such process starts at step 400 by retrieving the relevant software function, therefore the encoder calculates (step 401) the image average luminance according to the following formula:

$$Y\_average = \frac{\sum_{i=1}^{width*height} Y_i}{(width*height)} \qquad (3)$$

where $Y_i$ are luminance values of individual image pixels, width and height are width and height respectively of the image expressed as the number of pixels.

Then the encoder (step 402) checks whether the average luminance Y_average of the image is lower than a preset parameter, that in the example described herein is equal to 0.01 and, if so, it sets a parameter dynamic range to the value 0 (step 403) and it ends the process (step 404).

If the average luminance is higher than or equal to the preset parameter, then the encoder (step 405) checks whether the average luminance if higher than or equal to 1. If the average luminance is higher than or equal to 1, then the encoder (step 406) sets the parameter dynamic_range to a value equal to the sum of the dynamic range (dyn_range) calculated at step 101 and a parameter add_range (preferably ranging from 2 to 6) that can be predetermined or set by the user through the user interface of the encoder. Recapitulating, if Y_average>1, therefore:

$$dynamic\_range=dyn\_range+add\_range \quad (4)$$

If, on the contrary, Y_average≤1, then the value add_range is subtracted from the dynamic range of the input image. Therefore the encoder sets (step 407) the parameter dynamic_range as it follows:

$$dynamic\_range=dyn\_range-add\_range \quad (5)$$

In the preferred embodiment, in formulas (3) and (4), the value add_range is added (or subtracted respectively) to the dynamic range and converted as integer, as expressed in formulas (4a) and (5a) below:

$$dynamic\_range=(int)dyn\_range(HDR)+add\_range \quad (4a)$$

$$dynamic\_range=(int)dyn\_range(HDR)-add\ range \quad (5a)$$

Thus an integer value dynamic_range is obtained.

The encoder now (step 103) changes the color values of the pixel of the high dynamic range image depending on average luminance of the acquired image. In the embodiment described herein, pixels of the HDR image acquired at step 100 are multiplied by a factor $2-d_y$namic-ran$_g$e; thus an image EXPOSED is obtained defined by the formula (6) below:

$$EXPOSED=HDR*2^{-dynamic-range} \quad (6)$$

Finally the method (step 104) provides to carry out a gamma correction of the image EXPOSED, thus obtaining an encoded image ENCODED according to the formula (7) below:

$$ENCODED\_float=EXPOSED\ 1.0/(2.2+add\_garruna) \quad (7)$$

The gamma correction applied at step 104 is used for rendering purposes and such to obtain an acceptable backward compatible image (or in case of video encoding, a stream) and at the same time in order to prevent too many values close to 0 from being annulled by the following AVC or HEVC or MPEG or JPEG compression (step 106). Therefore the gamma corrected image is brought in the desired precision (step 105) for instance 8, 10, 12 or 16 bits, such to reduce overall dimensions of the file. The precision change is obtained in this manner:

$$ENCODED\_nbit=ENCODED\_float*((2\ bit\_precision)\_1) \quad (8)$$

where bit precision means the precision of the final image ENCODED_nbit, for example 8, 10, 12 or 16 bits.

Finally the encoder 200 (step 106) compresses and encodes, e.g. in MPEG, AVC, HEVC or JPEG, the low dynamic range image obtained at step 105. During the compression and encoding step 106, the encoder inserts among the metadata of the image ENCODED also information necessary to reconstruct the high dynamic range image from the encoded and compressed image. Among such information inserted in the metadata, the values of parameters add_gamma and dynamic_range used in the encoding step are comprised.

The output interface 205 of the encoder 200 saves on a mass memory the image compressed and encoded in this manner in a file and/or it transmits it as output.

The method described above allows high dynamic range images to be effectively and reversibly encoded and compressed, which thus can be effectively stored and transmitted with a low dynamic range (e.g. 8-bit/channel-pixel) such to be only later brought back in high dynamic range.

Figure 5:
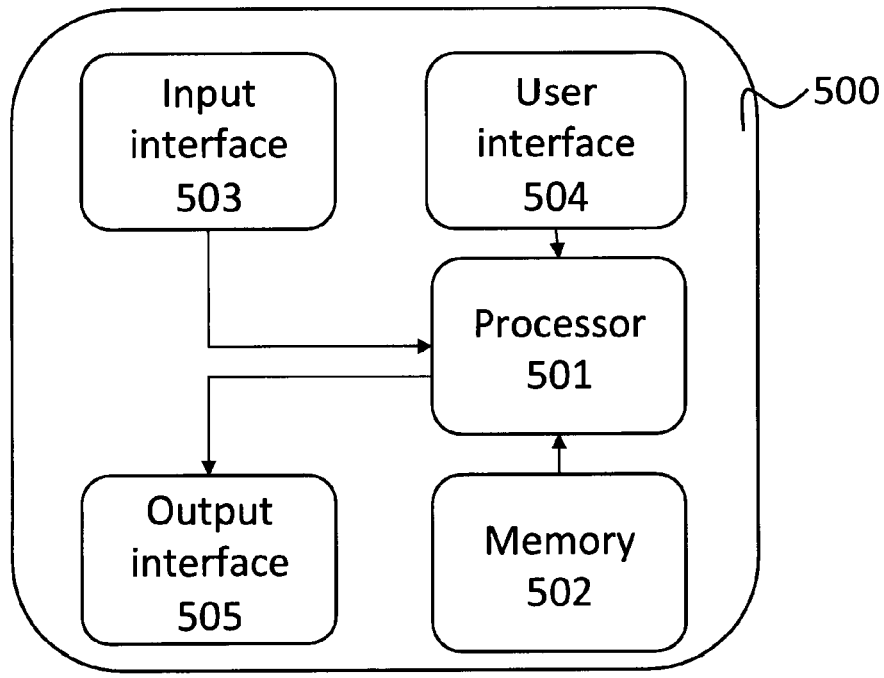
FIG. 5 schematically is a decoder able to implement the method of FIG. 6.
Figure 3:
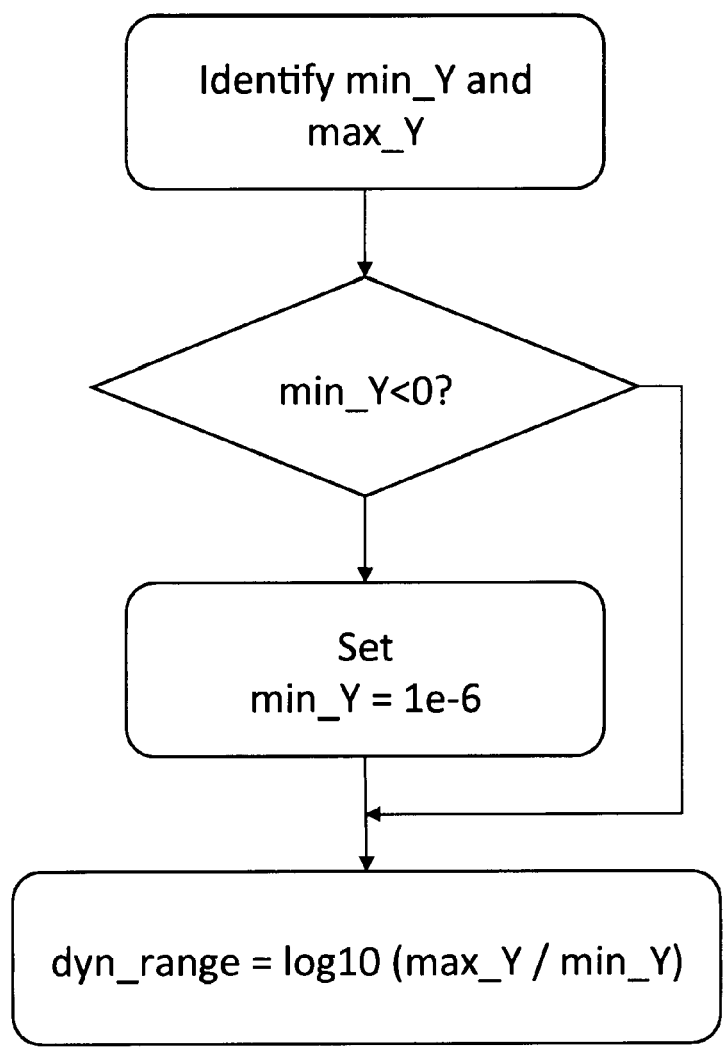
FIG. 3 is a flow chart of a method for calculating the image dynamic range.
Figure 6:
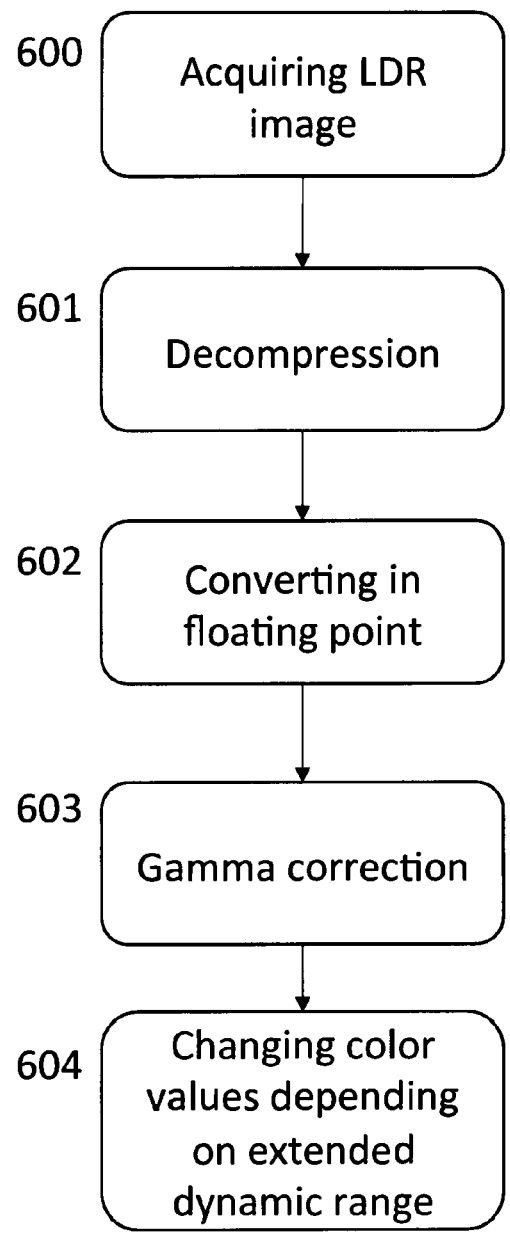
FIG. 6 is a flow chart of a method for decoding images encoded by the method of FIG. 1.

The encoded and compressed image, therefore can be brought back in high dynamic range by a decoding device (decoder) 500 of the type outlined in FIG. 5 that, provided with a processor 501, executes code portions stored in a memory area 502 allowing it to implement the decoding method described below with reference to FIG. 6.

The decoding method starts with the decoder 500 acquiring (step 600) through an input interface 503, data about a low dynamic range image encoded according to the encoding method described above.

By a suitable codec, the decoder (step 601) decompresses the compressed image, such to obtain an image DECODED_nbit at 8, 10, 12 or 16 bits that, except for compression-related losses, corresponds to the image ENCODED_nbit.

In order to reconstruct the high dynamic range image the decoder brings the image back in floating point format (step 602) by dividing the value of each bit by a factor equal to 2 raised to a power equal to the number of bits of the output image at step 601 minus 1, as shown below:

$$DECODED\_float=DECODED\_nbit/((2^{bit-precision})-1)$$

Then, step 603, the decoder carries out an inverse gamma correction with respect to the one operated in the encoding step; in details, the decoder calculates the image EXPOSED_inv as it follows:

$$EXPOSED\_inv=DECODEDfloat^{(2.2+add\_gamma)}$$

The value add_gamma is recovered by the decoder among the metadata of the image acquired at step 600.

Finally the decoder (600) corrects the color values of the pixels by multiplying them by a factor dependent from the dynamic range of the high definition image originally compressed. In details, the performed operation is the following:

$$DECODED\_HDR=EXPOSED\ Inv*2^{dynamic\_range}$$

As for add_gamma, the value dynamic_range is taken from the metadata of the image acquired at step 600.

The image DECODED_HDR therefore is saved in a file by the output interface 505 of the decoder.

As a prove for the goodness of the above method, we have taken a HDR image (shown in FIG. 7a) of 2.6 Mb. After having encoded and compressed it with the method mentioned above (add_gamma=0 and add_range=3), the image has been saved in JPEG 8-bit per channel and the dimensions of the compressed file were 467 kb (FIG. 7b). By applying the decoding steps mentioned above, the high dynamic range image shown in FIG. 7c has been reconstructed, it having a dimension of 2.6 Mb too. As it is easy to see, the quality of the reconstructed image is very good and close to the original one.

Although the invention has been described with reference to some specific embodiments, the description has not to be interpreted in a limitative manner. Many changes to the described embodiments, as well as to alternative embodiments, can be implemented by the person skilled in the art after reading the present description. It is clear for the person skilled in the art that the idea and the specific embodiment described can be slightly modified or used as a base for modifying or designing other methods and structures. The division into logic blocks has not to be interpreted as a limitation, since logic blocks can be grouped or organized in a manner different from the above.

For example in one variant it is possible to provide the user of the decoder to enter or to change some decoding parameters. For example by a user interface 504 the user can enter the parameters add_gamma and dynamic range.

Still, in one embodiment particularly useful for encoding and transmitting videos, at step 102 the following logic is preferably applied.

If dynamic range (dyn_range) calculated for the current frame is higher than zero, and if such dynamic range has a value comprised between the dynamic range value of the previous frame (according to the displaying order) plus or minus the value add_range, then for the encoding at step 103 the value of the parameter dynamic_range calculated for the previous frame is used. Otherwise the value of the parameter dynamic_range is calculated according to the procedure described above with reference to FIG. 4.

In case of encoding video signals (as known to be composed of a sequence of images, called as frames) it is possible to use a single value dynamic_range calculated as described above, for the whole video sequence.

Particularly in such embodiment the method provides to calculate the value dynamic_range for all the frames composing the video sequence, then the average of the values dynamic_range calculated in this manner is used for encoding the frames of the video sequence. Also the value add_gamma can be a single one for the video sequence. In this case the decoding step occurs with only one value add_gamma and dynamic_range. Thus the number of metadata necessary for the decoding is drastically reduced.

In this embodiment the method for encoding a video comprising a plurality of images, therefore provides to carry out the following steps:

a) acquiring a high dynamic range image in floating point format;
b) calculating the dynamic range of the acquired image;
c) calculating the image average luminance;
d) calculating a parameter dynamic_range by adding to or subtracting from the dynamic range value calculated at step b) a predetermined value, the addition or subtraction of such predetermined value depending on image average luminance calculated at step c);

Then the method provides to calculate the parameter dynamic_range as the average value of the parameters dynamic_range calculated for each image of said plurality of images, and to encode each image of said plurality of images by implementing for each image the following steps:

e) multiplying the values of the pixels of the acquired image by a factor equal to $2^{-dynamic\_range\_avg}$;
f) raising to a power equal to 1.0/(2.2+add_gamma) the values of the pixels calculated at step e), where add_gamma is a value higher than or equal to zero;
g) reducing the number of bits used for encoding the image pixels such to convert the image in a format with a dynamic range lower than that of the acquired image;
h) compressing the lower dynamic range image.

Obviously it is possible to apply to the encoding of individual video frames all the arrangements and variants described above for encoding a single static image, such as for example the choice of whether adding or subtracting add_range depending on the is luminance.

Finally it is specified that the invention is not limited to a hardware encoder and/or decoder but it relates also to computer programs containing code portions that, when executed by the computer, allow encoding and/or decoding methods described above to be implemented. To this end it has to be noted how such methods allow image data to be processed and converted while reducing dimensions of the files storing them (therefore saving memory space to save them and/or saving band necessary for transmission) however guaranteeing a quite faithful reconstruction of HDR images.

What is claimed is:

1. A method for encoding high dynamic range images, comprising the steps of:
   (a) acquiring a high dynamic range image in floating point format, wherein each color channel of the high dynamic range image is coded with N bits;
   (b) calculating a dynamic range value of the high dynamic range image;
   (c) calculating an image average luminance value of the high dynamic range image;
   (d) calculating a parameter dynamic range by:
       adding a predetermined value to the dynamic range value calculated at step b) if the average luminance value calculated at step c) is higher than a predetermined threshold, or
       subtracting the predetermined value from the dynamic range value calculated at step b) if the average luminance value calculated at step c) is equal or lower than the predetermined threshold;
   (e) multiplying the values of pixels of the high dynamic range image by a factor equal to $2^{-dynamic\_range}$;
   (f) raising the multiplied values of the pixels to a power equal to 1.0/(2.2+add_gamma) the values of the pixels calculated at step e), where the parameter add_gamma is a value higher than or equal to zero;
   (g) reducing to a number of bits M, where M<N, the number of bits used for encoding each color channel of the high dynamic range image by multiplying the pixel values raised at step f) for a value $(2^M-1)$ thereby converting the high dynamic range image to a low dynamic range image having a format with a dynamic range lower than that of the high dynamic range image; and
   (h) compressing the low dynamic range image.

2. The method according to claim 1, wherein the predetermined value is 1.

3. The method according to claim 1, wherein step d) is performed if average luminance is higher than a predetermined minimum value.

4. The method according to claim 1, wherein the predetermined value is from 2 to 6.

5. The method according to claim 1, wherein the predetermined value is received from a user of a device performing the method.

6. The method according to claim 1,
   wherein the high dynamic range image is a current frame of a video signal,
   wherein said video signal comprises said current frame and a previous frame displayed immediately before said current frame,
   wherein step d) is implemented for the current frame if the dynamic range value calculated at step b) falls outside the range of values ranging from dynamic_range_prev−add_range to dynamic_range_prev+add_range, where dynamic_range_prev is the dynamic range value of the previous frame, and wherein the value of the parameter dynamic_range calculated for the previous frame is used if the dynamic range value calculated at step b) falls within the range of values ranging from dynamic_range_prev−add_range to dynamic_range_prev+add_range.

7. The method according to claim 1, further comprising receiving the parameter add_gamma from a user of a device performing the method.

8. The method according to claim 1, wherein step h) comprises utilizing a compression standard selected from the group consisting of MPEG, JPEG, AVC, and HEVC.

9. The method according to claim 1, further comprising the step of:
saving the low dynamic range image in a data file comprising metadata and pixel values,
wherein metadata comprise the predetermined value.

10. The method according to claim 9, wherein metadata comprise the parameter add_gamma.

11. Method A method for encoding a video comprising a plurality of images, wherein for each image of said plurality of images the following steps are performed:
a) acquiring a high dynamic range image in floating point format;
b) calculating a dynamic range value of the high dynamic range image;
c) calculating an image average luminance value of the high dynamic range image;
d) calculating a parameter dynamic_range by:
adding a predetermined value to the dynamic range value calculated at step b), or
subtracting the predetermined value from the dynamic range value calculated at step b),
wherein the addition or subtraction of the predetermined value depending on image average luminance value calculated at step c);
wherein the method further comprises the steps of:
calculating a parameter dynamic_range_avg, as the average value of the parameters dynamic_range calculated for each image of said plurality of images, and
encoding each image of said plurality of images by implementing for each image the following steps:
e) multiplying the values of pixels of the high dynamic range image by a factor equal to $2^{-dynamic\_range}$;
f) raising the multiplied values of the pixels to a power equal to 1.0/(2.2+add_gamma) the values of the pixels calculated at step e), where add_gamma is a value higher than or equal to zero;
g) reducing the number of bits used for encoding the image pixels such to convert the high dynamic range image to a low dynamic range image having a format with a dynamic range lower than that of the high dynamic range image; and
h) compressing the low dynamic range image.

12. An encoder intended to receive as input a high dynamic range image and to implement the method according to claim 11.

13. The method for decoding image data encoded according to the method of claim 1, comprising the steps of:
acquiring a low dynamic range image encoded according to the method of claim 1;
decompressing the low dynamic range image;
performing a gamma correction by raising the multiplied values of the pixels to a power equal to 2.2+add_gamma the values of the pixels of the low dynamic range image;
correcting the values of the pixels of the low dynamic range image by multiplying them by a factor equal to $2^{dynamic\_range}$; and
further comprising at least one of:
retrieving the parameters add_gamma and dynamic_range from metadata of the low dynamic range image, or
receiving the parameters add gamma and dynamic_range from a user.

14. A decoder intended to receive as input the data of an image and to implement the method according to claim 13.

15. An encoder intended to receive as input a high dynamic range image and to implement the method according to claim 1.

16. A method for decoding image data encoded according to the method of claim 11, comprising the steps of:
acquiring a low dynamic range image encoded according to the method of claim 11;
decompressing the low dynamic range image;
performing a gamma correction by raising to a power equal to 2.2+add_gamma the values of the pixels of the high dynamic range image;
correcting the values of the pixels by multiplying them by a factor $2^{dynamic\_range}$; and
further comprising at least one of:
retrieving the parameters add_gamma and dynamic_range from metadata of the low dynamic range cquired image, or
receiving the parameters add gamma and dynamic range from a user.

17. The method according to claim 1:
wherein the predetermined value is from 2 to 6; and
wherein the predetermined value is received from a user to a device performing the method.

18. The method according to claim 1,
wherein the high dynamic range image is a current frame of a video signal,
wherein said video signal comprises said current frame and a previous frame displayed immediately before said current frame,
wherein step d) is implemented for the current frame if the dynamic range value calculated at step b) falls outside the range of values ranging from dynamic_range_prev−add_range to dynamic_range prev+add_range, where dynamic_range_prev is the dynamic range value of the previous frame,
wherein the value of the parameter dynamic_range calculated for the previous frame is used if the dynamic range value calculated at step b) falls within the range of values ranging from dynamic_range_prev−add_range to dynamic_range_prev+add_range; and
wherein the parameter add_gamma is provided by a user to a device performing the method.

19. The method according to claim 1:
wherein at step d) the predetermined value is from 2 to 6;
wherein the predetermined value is received from a user of a device performing the method;
wherein the high dynamic range image is a current frame of a video signal;
wherein said video signal comprises said current frame and a previous frame displayed immediately before said current frame;
wherein step d) is implemented for the current frame if the dynamic range value calculated at step b) falls outside the range of values ranging from dynamic_range_prev−add_range to dynamic_range_prev+add_range, where dynamic_range_prev is the dynamic range value of the previous frame;

wherein the value of the parameter dynamic_range calculated for the previous frame is used if the dynamic range value calculated at step b) falls within the range of values ranging from dynamic_range_prev−add_d_range to dynamic_range_prev+add_range; and wherein the parameter add_gamma is received from a user of a device performing the method.

20. A method for encoding high dynamic range images, comprising the steps of:
   a) acquiring a high dynamic range image in floating point format, wherein each color channel of the high dynamic range image is coded with N bits;
   b) calculating a dynamic range value of the high dynamic range image;
   c) calculating an image average luminance value of the high dynamic range image;
   d) calculating a parameter dynamic_range by:
      adding a predetermined value to the dynamic range value calculated at step b) if the average luminance value calculated at step c) is higher than a predetermined threshold, or
      subtracting the predetermined value from the dynamic range value calculated at step b) if the average luminance value calculated at step c) is equal or lower than the predetermined threshold,
   wherein the predetermined value is 1, and
   wherein step d) is performed if the average luminance value is higher than a predetermined minimum value;
   e) multiplying the values of pixels of the high dynamic range image by a factor equal to $2^{-dynamic\_range}$;
   f) raising the multiplied values of the pixels to a power equal to 1.0/(2.2+add_gamma) the values of the pixels calculated at step e), where add_gamma is a value higher than or equal to zero;
   g) reducing to a number of bits M, where M<N, the number of bits used for encoding each color channel of the high dynamic range image by multiplying the pixel values raised at step f) for a value $(2^M-1)$ thereby converting the high dynamic range image to a low dynamic range image having a format with a dynamic range lower than that of the high dynamic range image; and
   h) compressing the low dynamic range image.

* * * * *